United States Patent
Kuefler et al.

(10) Patent No.: US 9,989,991 B1
(45) Date of Patent: Jun. 5, 2018

(54) WORK SURFACE EXPANSION WITH EMMISSIVE DISPLAYS

(71) Applicant: Rockwell Collins, Inc., Cedar Rapids, IA (US)

(72) Inventors: Alan M. Kuefler, Marion, IA (US); Tracy J. Barnidge, Marion, IA (US)

(73) Assignee: Rockwell Collins, Inc., Cedar Ridge, IA (US)

( * ) Notice: Subject to any disclaimer, the term of this patent is extended or adjusted under 35 U.S.C. 154(b) by 346 days.

(21) Appl. No.: 14/681,708

(22) Filed: Apr. 8, 2015

(51) Int. Cl.
*H05K 5/00* (2006.01)
*G01C 23/00* (2006.01)
*G06F 1/16* (2006.01)
*G06F 1/18* (2006.01)
*B64D 43/00* (2006.01)

(52) U.S. Cl.
CPC .......... *G06F 1/1601* (2013.01); *B64D 43/00* (2013.01); *G01C 23/005* (2013.01); *G06F 1/182* (2013.01)

(58) Field of Classification Search
CPC .... G06F 1/1616; G06F 1/1637; G06F 1/1618; Y10S 248/921
See application file for complete search history.

(56) References Cited

U.S. PATENT DOCUMENTS

| | | | |
|---|---|---|---|
| 6,405,975 B1 * | 6/2002 | Sankrithi | B64D 47/08 244/1 R |
| 7,405,773 B2 * | 7/2008 | Lester | B60R 11/0235 348/825 |
| 8,493,726 B2 * | 7/2013 | Visser | G06F 1/1601 361/679.05 |
| 9,372,513 B1 * | 6/2016 | Riddiford | G06F 1/1681 |

* cited by examiner

*Primary Examiner* — Robert J Hoffberg
*Assistant Examiner* — Hung Dang
(74) *Attorney, Agent, or Firm* — Angel N. Gerdzhikov; Donna P. Suchy; Daniel M. Barbieri

(57) ABSTRACT

Emissive display apparatuses include an emissive display and a display support to moveably support the emissive display relative to an avionics instrument panel. The moveable support includes folding movement, rotating movement, sliding movement, and retractable movement between deployed and stowed positions.

19 Claims, 10 Drawing Sheets

WORK SURFACE EXPANSION WITH EMMISSIVE DISPLAYS

BACKGROUND

As means for monitoring and displaying data becomes more advanced, the surface area necessary to present this data (e.g., on an instrument panel) has become more cluttered. This is particularly true for control-heavy facilities (e.g., maintenance terminals) and vehicles (e.g., aircraft or submarines), where work surface area is at a premium.

Conventional solutions include the use of liquid crystal displays (LCD) or other large surface displays because of their widespread use, their display versatility, and the functionality they enable. However, these displays require a great deal of surface area and are pressure sensitive. Additionally, most instrument panel surfaces are restricted to a single layer (e.g., are substantially coplanar with the instrument panel) or single purpose functions (e.g., buttons or switches). Although tremendous effort is expended to balance maximum functionality, information availability, and the efficiency/comprehensibility of the instrument panel interface, single layer and single purpose surfaces are limiting. Therefore, it is desirable to provide one or more apparatuses to cure the deficiencies of the prior art.

SUMMARY

Embodiments of the inventive concepts disclosed herein are directed to moveable emissive display apparatuses. In one aspect, the inventive concepts disclosed herein are directed to embodiments of a moveable emissive display apparatus comprising: an emissive display having a first end and a second end; and a display support to moveably support the emissive display relative to an instrument panel.

In a further aspect, the inventive concepts disclosed herein are directed to embodiments of a deployable emissive display apparatus comprising: an emissive display having a first end and a second end; and a display support to moveably support the emissive display relative to an instrument panel.

In a further aspect, the inventive concepts disclosed herein are directed to embodiments of a moveable human machine interface (HMI) apparatus comprising: an emissive display having a proximal end and a distal end; and a display support to moveably support a portion of the emissive display apparatus relative to an instrument panel, wherein, the portion of the emissive display apparatus that is moveably supported comprises at least one of the emissive display or a keypad.

It is to be understood that both the foregoing general description and the following detailed description are illustrative and explanatory only and are not restrictive of the inventive concepts disclosed and claimed herein. The accompanying drawings, which are incorporated in and constitute a part of the specification, illustrate embodiments of the inventive concepts and together with the general description, serve to explain the principles and features of the inventive concepts disclosed herein.

BRIEF DESCRIPTION OF THE DRAWINGS

The numerous objects and advantages of the inventive concepts disclosed herein may be better understood by those skilled in the art by reference to the accompanying figures in which.

DETAILED DESCRIPTION

Figure 1B:
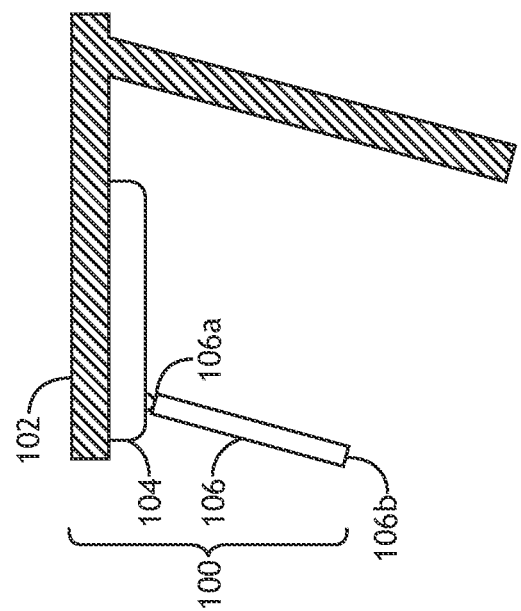
FIGS. 1A-1B are block diagrams of an embodiment of a moveable emissive display integrated with an instrument panel.

The emissive display apparatuses and the inventive concepts of the present disclosure expand work surfaces in many environments by layering multiple human interfaces. They may also help decrease user visual and cognitive processing workload by stowing one or more components, reducing the number of components visible at one time. Multi-layer work surfaces are created by moving components of the emissive display apparatuses between deployed and stowed positions. The layering aspects of the present disclosure utilize previously unusable surface areas through the use of moveable, thin, and/or flexible display surfaces.

Referring generally now to FIGS. 1A-5B, illustrations depicting embodiments of an emissive display apparatus (e.g., 100, 200, 300, 400, and 500) integrated with an instrument panel (e.g., 102, 202, 302, and 502) are shown. In aspects of the inventive concepts disclosed herein, the instrument panel is an avionics instrument panel. For example, the avionics instrument panel may be an aircraft instrument panel, an aircraft maintenance terminal instrument panel, or a simulator instrument panel.

In aspects of the inventive concepts disclosed herein, the location of the instrument panel is not limiting. In this regard, the instrument panel may be located in a maintenance facility (e.g., maintenance terminal), a testing facility (e.g., simulator), or a vehicle (e.g., cockpit of an aircraft).

Aspects of the inventive concepts disclosed herein are directed to embodiments of an emissive display apparatus including an emissive display (e.g., 106, 206, 306, 406, and 506) and a display support (104, 204*a* and 204*b*, 304, and 504). The display support is attached, connected, or otherwise integrated with the instrument panel in order to moveably support the emissive display between a stowed position and a deployed position. In this regard, the portion of the instrument panel with which the display support is integrated is not limiting, so long as recommended practices and guidelines are followed (e.g., as with an integrated cockpit/ flightdeck, information on the primary flight display (PFD) cannot be obstructed).

In aspects of the inventive concepts disclosed herein, the emissive display includes a thin but relatively rigid emissive display (e.g., 106, 206, and 406). In further aspects of the inventive concepts disclosed herein, the emissive display includes a flexible emissive display (e.g., 306 and 506).

Aspects of the inventive concepts disclosed herein, are directed to an emissive display utilizing one or more emissive display technologies, including, but not limited to, organic light-emitting diode (OLED) technologies, which include passive-matrix OLED and active-matrix OLED. For example, an active-matrix OLED display may be used in one or more layering aspects of the present disclosure due to its pressure-resistive advantages (e.g., as compared to a liquid crystal display (LCD) which are sensitive to pressure) or its flexible advantages (e.g., ability to bend without damaging the screen substrates).

Figure 1A:
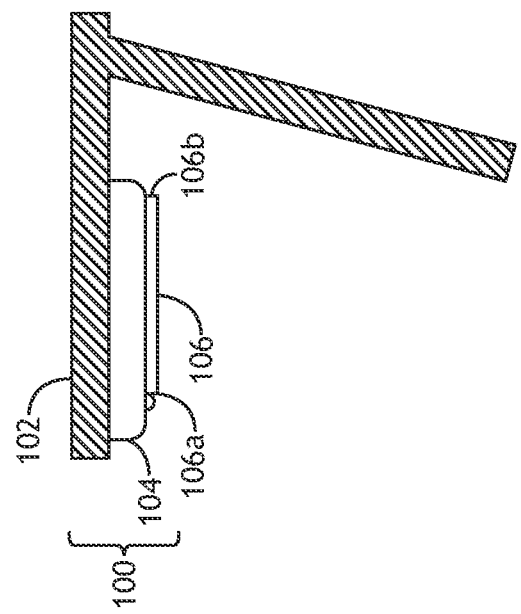

Referring now to FIGS. 1A-1B, an embodiment of an emissive display apparatus 100 includes a display support 104 integrated with a glare shield of an instrument panel 102 and a folding emissive display 106. In this embodiment, folding movement is defined as tilting the emissive display 106 back and forth between a deployed position as shown in FIG. 1A and a stowed position as shown in FIG. 1B. For example, the display support 104 may moveably support a first end 106a of the emissive display 106 to tilt the emissive display 106 by rotating a second end 106b of the emissive display 106 azimuthally relative to the display support 104. For instance, the second end 106b may be rotated towards an underside portion of a glare shield of an instrument panel 102.

In a further aspect, the inventive concepts disclosed herein are directed to the embodiment of the emissive display apparatus 100 of FIGS. 1A-1B being positioned to expand (e.g., create at least a bi-layer) a work surface on an instrument panel. For example, the display support 104 may be positioned such that one or more instruments/components of the instrument panel 102 are visible and accessible when the emissive display 106 is in a stowed position and are not fully visible or fully accessible when the emissive display is in a deployed position. In this regard, "fully visible" or "fully accessible" means that the one or more instruments/ components are not completely visible and/or completely accessible from a direct line-of-sight angle relative to a user (e.g., pilot) of the emissive display apparatus 100 when the user assumes a normal operating position (e.g., sitting in a cockpit).

Figure 1C:
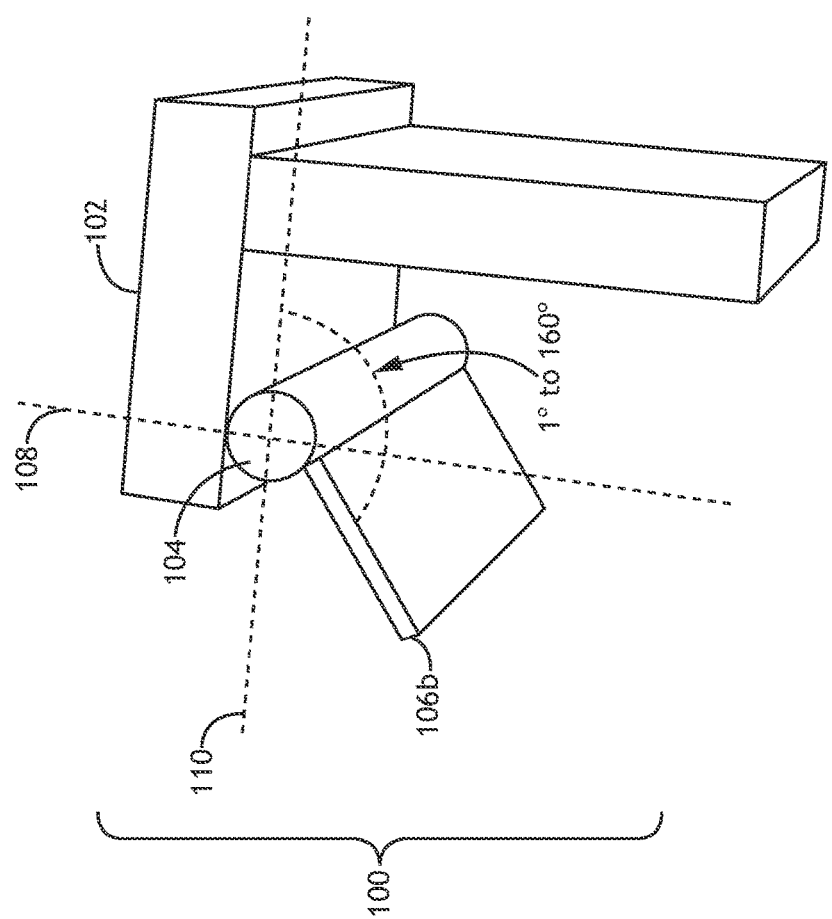
FIGS. 1C-1D are three-dimensional block diagrams of the embodiment of the moveable emissive display depicted in FIGS. 1A-1B.
Figure 1D:
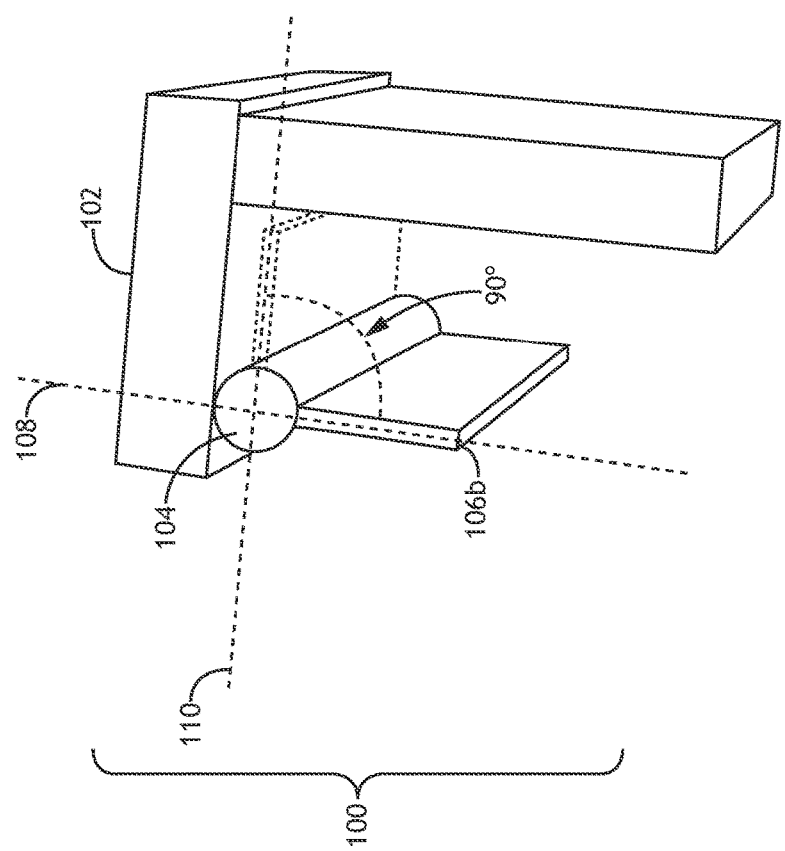

In a further aspect, the inventive concepts disclosed herein are directed to the embodiment of the emissive display apparatus 100 of FIGS. 1A-1B depicted in three-dimensional block diagrams in FIGS. 1C and 1D. In this regard, the display support 104 of the emissive display apparatus 100 has a vertical axis 108 and a longitudinal axis 110 and the folding movement of the emissive display 106 is further defined relative to vertical axis 108 and longitudinal axis 110. For example, referring to FIG. 1C, the folding movement may be further defined as the second end 106b of the emissive display is rotated azimuthally from one degree (1°) to one-hundred and sixty degrees (160°) relative to the longitudinal axis 110 of the display support 104. By way of another example, referring to FIG. 1D, the folding movement may be further defined by defining the stowed position and the deployed position of the emissive display 106 relative to the vertical axis 108 and the longitudinal axis 110. For instance, the deployed position may be defined by a minimum separation of approximately ninety degrees (90°) between the stowed position and the deployed position of the emissive display 106. In this regard, the second end 106b of the emissive display 106 is closer in proximity to the vertical axis 108 of the display support 104 in the deployed position than when in the stowed position. Also, the minimum separation of approximately ninety degrees (90°) is approximate because it is meant to define the deployed position as a position at which the emissive display 106 becomes visible to a user, which may not be exactly ninety degrees (90°) but might also include a minimum separation of sixty degrees (60°), seventy degrees) (70°, eighty degrees (80°), to ninety degrees (90°).

Figure 2B:
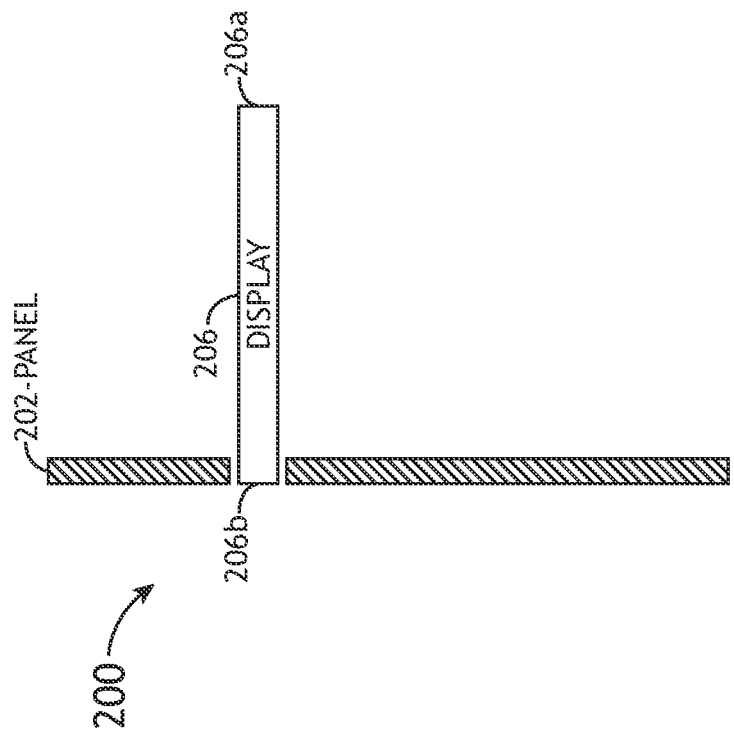
FIGS. 2A-2B are block diagrams of an embodiment of a deployable emissive display integrated with an instrument panel.
Figure 2A:
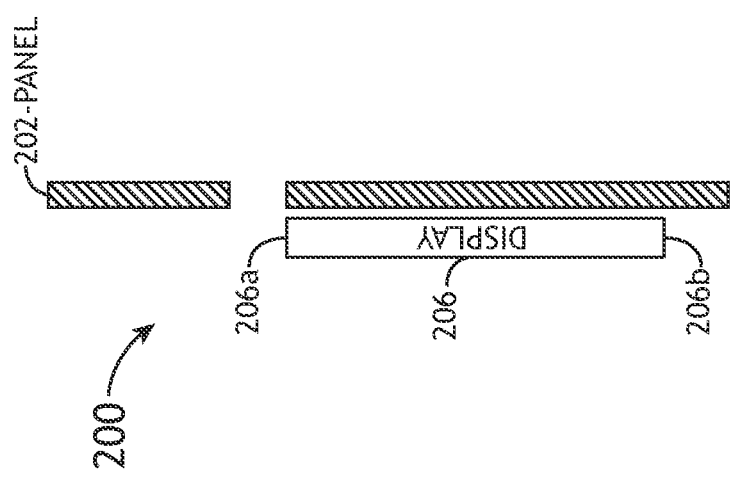
Figure 2C:
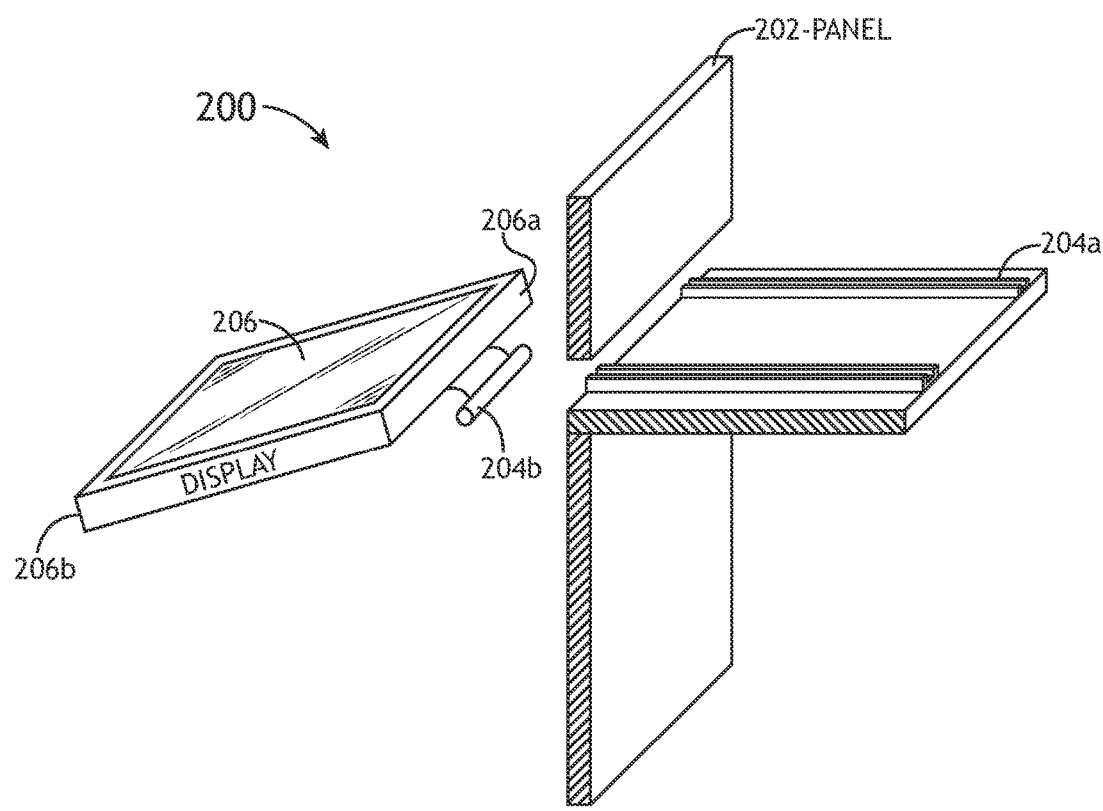
FIG. 2C is a three-dimensional block diagram of the embodiment of the deployable emissive display of FIGS. 2A-2B integrated with an instrument panel.

In a further aspect, the inventive concepts disclosed herein are directed to embodiments of an emissive display apparatus with an emissive display that both rotates (e.g., on a hinge) and moves (e.g., slides back and forth) between the stowed and the deployed position. Referring now to FIGS. 2A-2C, illustrations depicting an embodiment of a rotating and moving emissive display apparatus 200 integrated with an instrument panel 202 are shown. The emissive display apparatus 200 includes a deployable emissive display 206 and a display support 204. The display support 204 (e.g., 204a and 204b in FIG. 2C) is attached, connected, or otherwise integrated with the instrument panel 202 and the emissive display 206 in order to moveably support the emissive display 206 between a stowed position and a deployed position. For example, a first end 206a of the emissive display 206 may be moveably supported such that a second end 206b of the emissive display 206 may be rotatingly and slidingly moved relative to the display support 204. For instance, the display support 204 may include a sliding support 204a of one or more hinges 204b to move the emissive display 206 between the stowed and the deployed position. In this regard, the stowed position may be defined as the second end 206b (e.g., proximal end) is rotated on a hinge 204b and slid closer in proximity to the sliding display support 204a. The deployed position may be defined as the second end 206b is slid farther away from the sliding display support 204a and rotated on a hinge 204b to lay flat on the instrument panel 202.

Applicant notes that the display support 204 depicted as sliding display support 204a and the one or more hinges 204b are merely for illustrative purposes, and thus, are not limiting. Applicant further notes that a person skilled in the art would recognize a number of different means for moveably supporting the emissive display 206 in order to provide movement into and out of an inner stowing compartment of the instrument panel 202. Such means are encompassed in the inventive aspects of this disclosure, and include, but are not limited to, one or more friction hinges, one or more segmented supports, a telescoping support combined with one or more hinges, and various combinations.

Figure 2D:
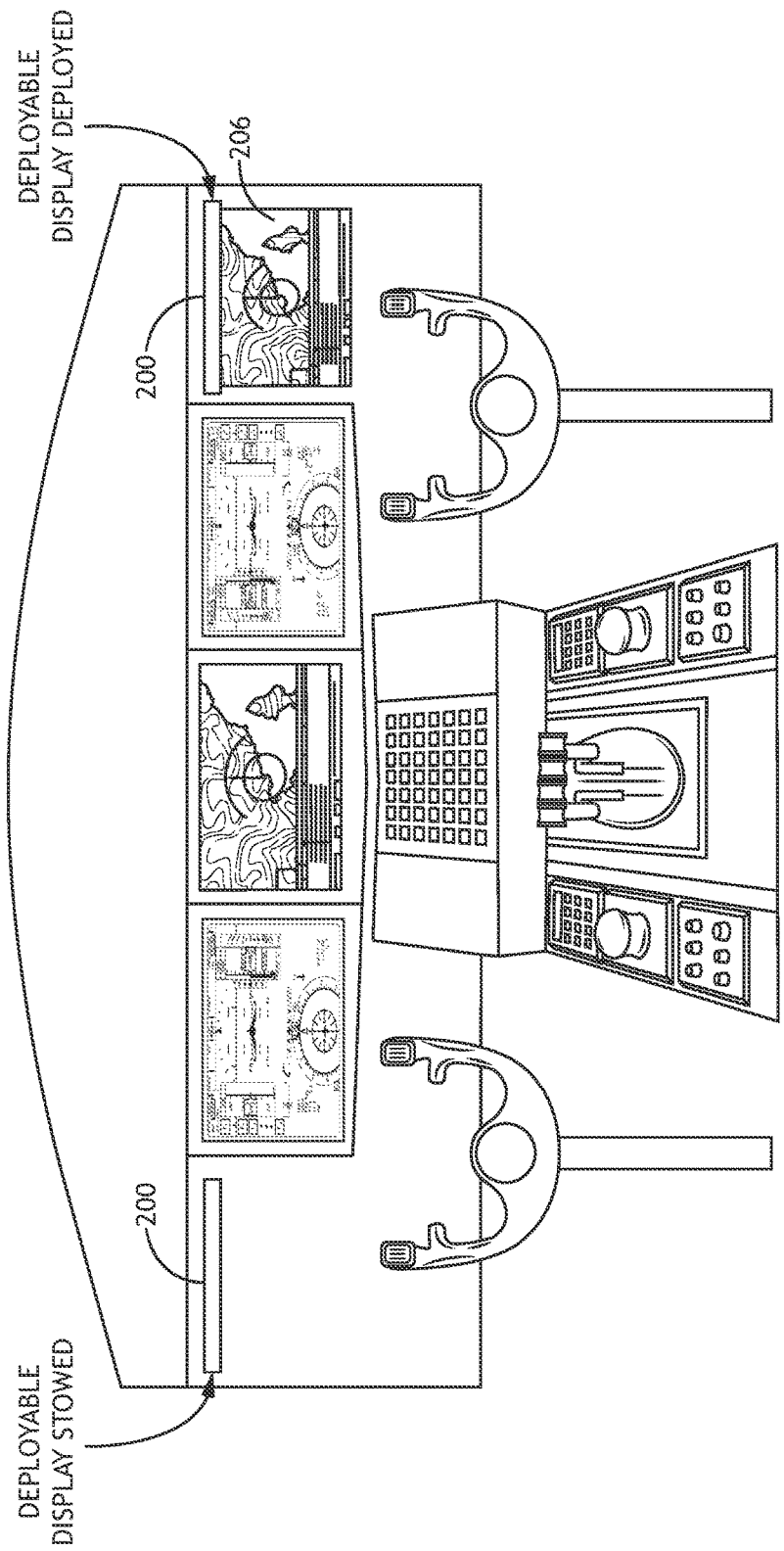
FIG. 2D is an illustration of a cockpit depicting the embodiment of the deployable emissive display of FIGS. 2A-2C integrated with an aircraft instrument panel.

In a further aspect, the inventive concepts of the present disclosure are directed to the deployable embodiment of the embodiment of the emissive display apparatus depicted in FIGS. 2A-2C integrated with an avionics instrument panel. Referring now to FIG. 2D, deployable emissive display apparatus 200 is integrated with an aircraft instrument panel such that the emissive display 206 is deployable immediately prior to use, and stowable after its use. For example, prior to use, the emissive display 206 of the deployable emissive display apparatus 200 may be stowed in a stowing compartment located in an inner portion of the instrument panel of a cockpit. In order to view the emissive display 206 of deployable emissive display apparatus 200, the emissive display 206 may be deployed (e.g., ejected or pulled out) from the stowing compartment.

In a further aspect, the inventive concepts disclosed herein are directed to the embodiment of the deployable emissive display apparatus 200 of FIGS. 2A-2C being positioned to expand (e.g., create at least a bi-layer) a work surface on an instrument panel. For example, the display support 204 may be positioned such that one or more instruments/components of the instrument panel 202 are visible and accessible when the emissive display 206 is in a stowed position and are not fully visible or fully accessible when the emissive display is in a deployed position.

In a further aspect, the inventive concepts disclosed herein are directed to an embodiment of an emissive display that is deactivated upon being moved to a stowed position and activated upon being moved to a deployed position. For example, referring again to FIG. 2D, while the emissive display 206 is stowed in the inner stowing compartment, the emissive display apparatus 200 may be in a deactivated state. However, if the emissive display 206 of the emissive display apparatus 200 is moved to a deployed position, then the emissive display 206 may initiate an activated state. Applicant notes that the use of emissive display apparatus 200 in the foregoing activating/deactivating example is merely for illustrative purposes, as any of the apparatuses disclosed herein may be configured to activate or deactivate upon being moved respectively to a deployed or a stowed position (e.g., with one or more position switches, with one or more inductive activation means, or other activation means known in the art).

Figure 3B:
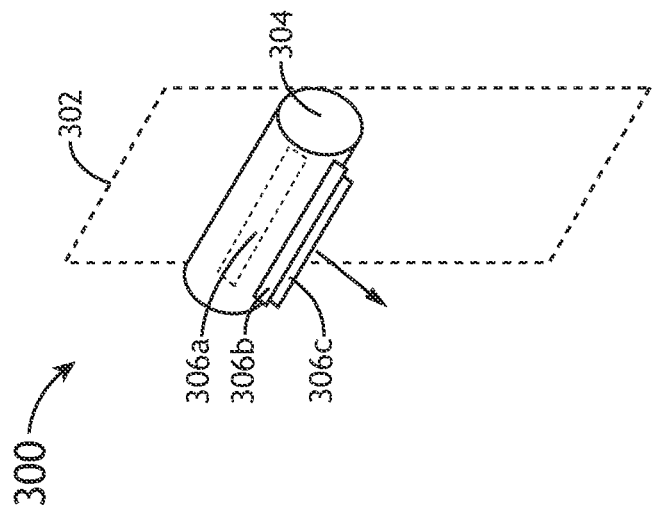
FIGS. 3A-3B are block diagrams of an embodiment of a rollable emissive display integrated with an instrument panel.
Figure 3A:
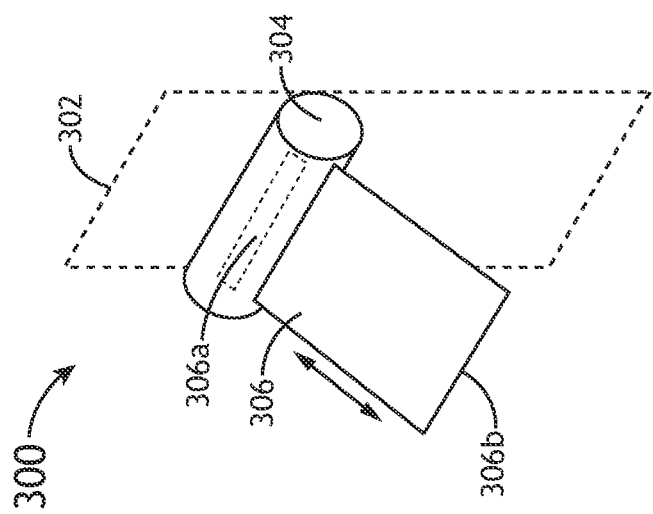
Figure 3C:
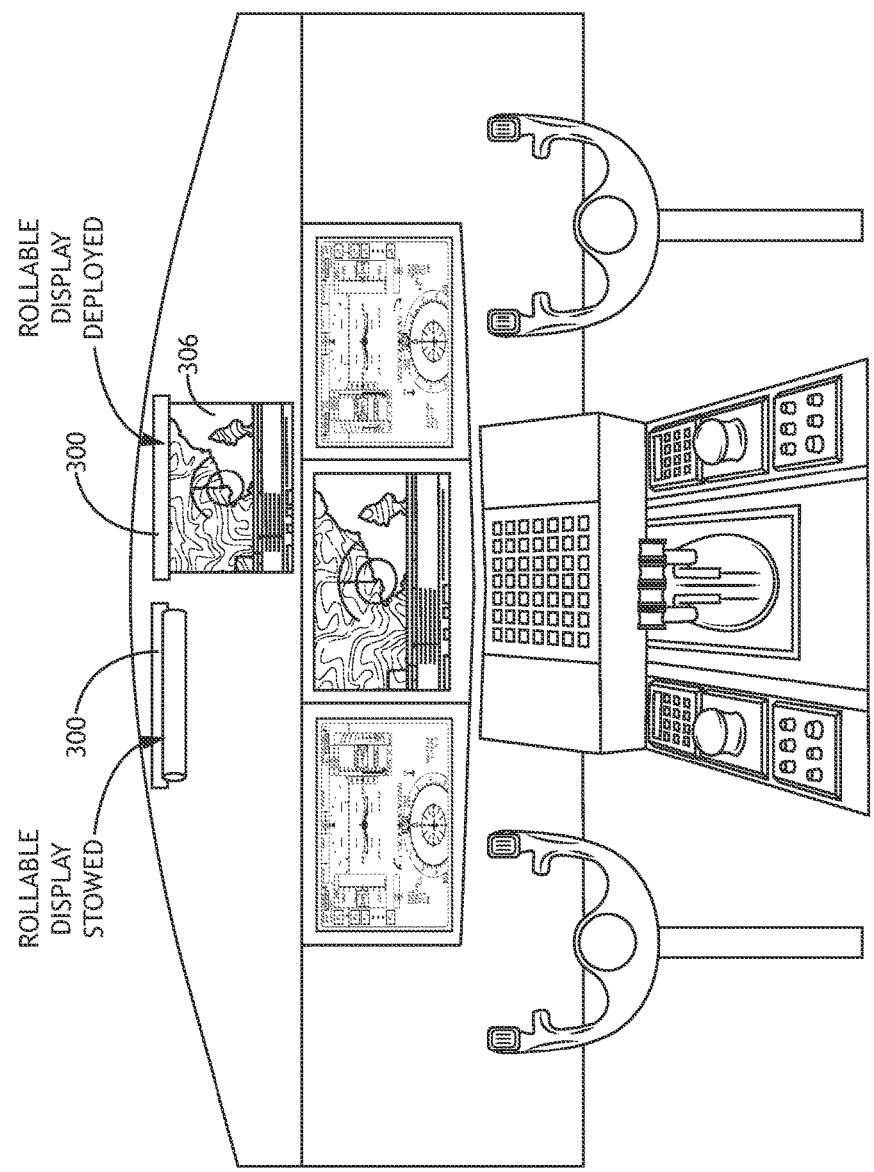
FIG. 3C is an illustration of a cockpit depicting the embodiment of the rollable emissive display of FIGS. 3A-3B integrated with an aircraft instrument panel.

In a further aspect, the inventive concepts disclosed herein are directed to an embodiment of an emissive display apparatus with an emissive display that rollably moves (e.g., on a roller tube) between a stowed and a deployed position. Referring now to FIGS. 3A-3C, illustrations depicting an embodiment of a rollable emissive display apparatus 300 integrated with an instrument panel 302 are shown. The emissive display apparatus 300 includes a flexible emissive display 306. The display support 304 is attached, connected, or otherwise integrated with the instrument panel 302 in order to support the flexible emissive display 306 while moving between the stowed position and the deployed position.

In this regard, a first end 306a (e.g., distal end) of the emissive display 306 is attached to a portion of the display support 304 (e.g., a roller tube) to rollably move a second end 306b (e.g., proximal end) of the emissive display 306 with respect to the display support 304. For example, the emissive display 306 may be positioned such that the second end 306b of the emissive display 306 may be moved towards the display support 304, such that the first end 306a of the emissive display 306 is rolled about a portion of the display support 304 (e.g., a roller tube). In order to use the rollable emissive display apparatus 300, the emissive display 306 may be deployed (e.g., rollably ejected or pulled out via 306c) from the stowing compartment (e.g., cylindrical housing integrated with display support 304).

In a further aspect, the inventive concepts of the present disclosure are directed to the embodiment of the rollable emissive display apparatus 306 depicted in FIGS. 3A-3B integrated with an avionics instrument panel such that the emissive display is rollably deployable immediately prior to use, and rollably stowable after its use. For example, referring to FIG. 3C, prior to using the rollable emissive display 306, the rollable emissive display 306 may be stowed in a stowing compartment located on an underside of a glare shield of the instrument panel in a cockpit. In order to use the rollable emissive display 306, the rollable emissive display is deployed (e.g., rollably ejected or pulled out via 306c).

In a further aspect, the inventive concepts disclosed herein are directed to the embodiment of the emissive display apparatus 300 of FIGS. 3A-3C being positioned to expand (e.g., create at least a bi-layer) a work surface on an instrument panel. For example, the display support 304 may be positioned such that one or more instruments/components of the instrument panel 302 are visible and accessible when the emissive display 306 is in a stowed position and are not fully visible or fully accessible when the emissive display is in a deployed position.

In a further aspect, the inventive concepts disclosed herein are directed to the rollable emissive display apparatus 300 of FIGS. 3A-3C that is further configured to retractably move to the stowed position. For example, referring again to FIGS. 3A and 3B, an embodiment of the emissive display apparatus 300 may also include a detent (not shown) configured to lock the moveable emissive display 306 in the deployed position upon a first change in an inertia or a first change in a direction of the movement of the second end 306b of the emissive display 306. The detent may be further configured to unlock the emissive display 306 and release a stored retractive force upon a second change in an inertia or a second change in direction of the movement (e.g., as with a retractable window shade).

Applicant notes that the use of the detent to retractably move the emissive display 306 to a stowed position is merely for illustrative purposes. For instance, gears or one or more electronic motors may be used to retract the rollable emissive display 306 to the stowed position.

In a further aspect, the inventive concepts disclosed herein are directed to embodiments of a human machine interface (HMI) apparatus (e.g., apparatus 400 or 500) with a keypad. Upon being moved to a deployed position, the emissive display of the HMI apparatus may be above one or more components located on an instrument panel, creating at least a bi-layer user interface. The keypad of the HMI apparatus includes, but is not limited to, a full alphanumeric keypad, 12 line-select keys, generic function keys, and/or an opaque or transparent multi-touch keypad. For example, the HMI apparatus may include a control display unit (CDU), a multi-function display (MFD), a multifunction control display unit (MCDU), an engine-indicating and crew-alerting system (EICAS), a keyboard video display terminal (KVDT), an integrated monitoring alarm and control system (IMAC—such as with marine vessels), or other HMI apparatuses with a keypad and/or used in a control-heavy environment (e.g., an aircraft, a submarine, a simulator, a maintenance terminal, etc.).

In a further aspect, embodiments of the HMI apparatus also include wired or wireless communication means configured to comply with commercially supported standards. For example, the communication means may be configured to comply with standards including, but not limited to, IEEE 802.3 Ethernet, PCI, PCI Mezzanine Card (PMC) per IEEE 1386, POSIX, controller area network (CAN) bus, wireless local area network (WLAN), or wide area network (WAN).

In a further aspect, embodiments of the HMI apparatus include a controller with one or more processors, and other components for communicating, consolidating controls, and/or controlling multiple systems within a control-heavy environment (e.g., aircraft, submarine, maintenance terminal, etc.). For example, the controller and one or more processors may be configured to communicate with and/or interface with one or more flight management computers (FMC), which are configured to communicate and/or interface with one or more commercial Communication Navigation Surveillance/Air Traffic Management (CNS/ATM) and military Global Air Traffic Management (GATM) systems. By way of another example, the controller and one or more processors may be configured to communicate with and/or interface with an integrated monitoring alarm and control system.

In a further aspect, the one or more processors of the controller (not shown) include any processing elements known in the art. For example, the one or more processors may include any microprocessor-type device configured to execute algorithms and/or instructions. In general, the term "processor" may be broadly defined to encompass any device having one or more processing elements, which execute program instructions from a non-transitory memory medium. Moreover, different components of the HMI apparatus (e.g., emissive display 406 or 506, or keypad 408 or 508) may include a processor or logic element suitable for carrying out at least a portion of the processes carried out by the HMI apparatus. Therefore, the above description related to the one or more processors should not be interpreted as a limitation on aspects of the present disclosure, but is merely for illustrative purposes.

Figure 4:
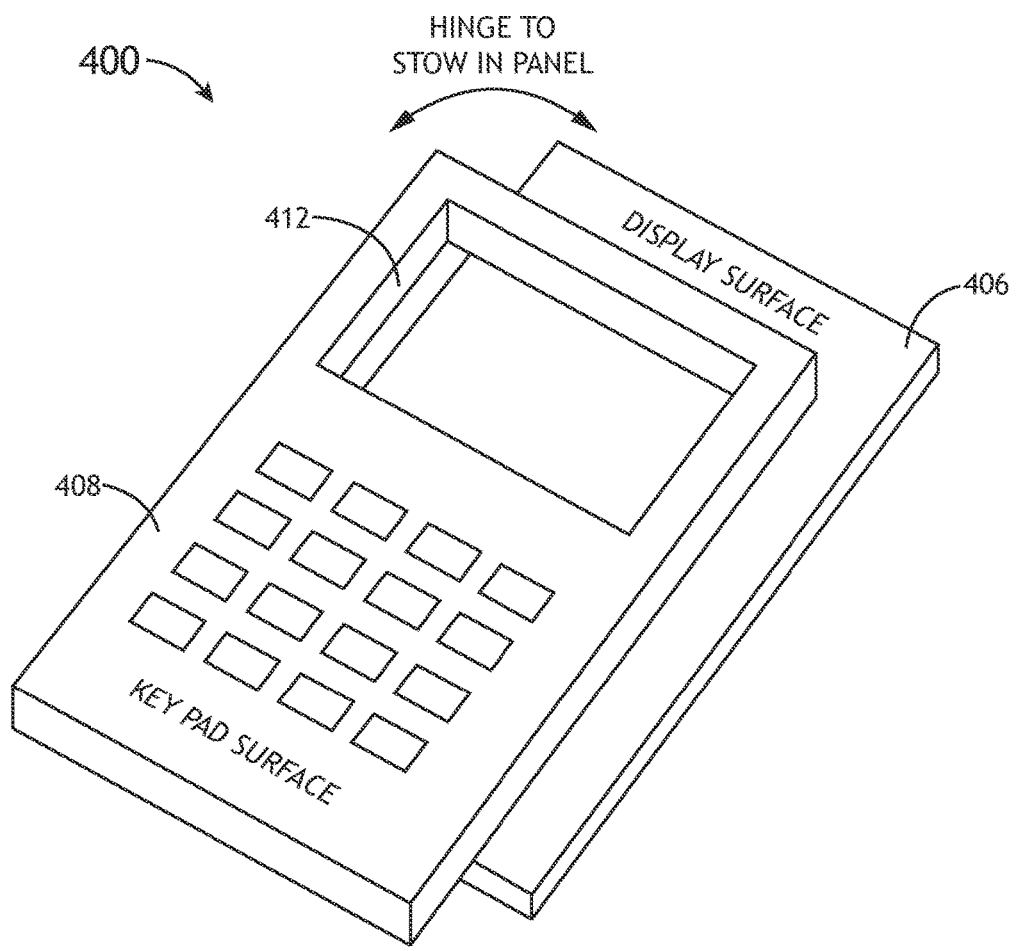
FIG. 4 is a block diagram of an embodiment of a human machine interface (HMI) apparatus with an emissive display and keypad integrated with an instrument panel.

In a further aspect, the inventive concepts disclosed herein are directed to embodiments of a HMI apparatus with a thin and relatively rigid emissive display. Referring now to FIG. 4, an embodiment of the HMI apparatus (e.g., HMI apparatus 400) includes a thin and fairly rigid emissive display (e.g., emissive display 406), a display support (e.g., not shown but similar to display support 204), and a keypad (e.g., keypad 408).

In a further aspect, the display support of the HMI apparatus 400 (not shown in FIG. 4) is configured to moveably support either the emissive display 406 (e.g., as with display support 204) or the keypad 408 of the emissive display apparatus 400. In this regard, either the keypad 408 or the emissive display 406 is hinged to move between the stowed or the deployed positions relative to the instrument panel (e.g., as with the emissive display 206 of the emissive display apparatus 200).

In a further aspect, the inventive concepts disclosed herein are directed to embodiments of a HMI apparatus having both the keypad and the emissive display moveably supported by the display support. For example, the HMI apparatus 400 may be configured such that both the emissive display 406 and the keypad 408 are moveably supported to move between a stowed or deployed position. For instance, the emissive display 406 and the keypad 408 may be adapted to have one or more hinges and a sliding support (e.g., as with emissive display apparatus 200 in FIG. 2C). In this regard, the keypad may move simultaneous with or sequential to the emissive display (e.g., moves together, or moves one right after the other). Upon being moved to the deployed position, the emissive display 406 may be above one or more components of the instrument panel, and the keypad 408 may then be moved above the emissive display 406, creating a multi-layer user interface.

Figure 5A:
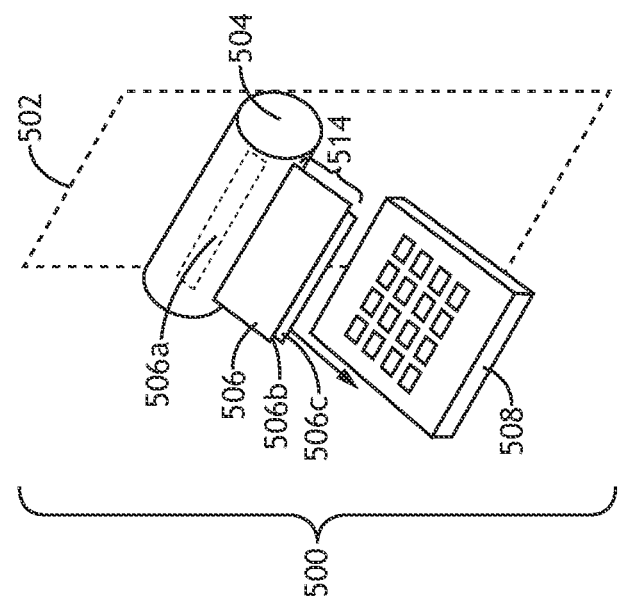
FIGS. 5A-5B are block diagrams of an embodiment of a human machine interface (HMI) apparatus with a flexible emissive display and keypad integrated with an instrument panel.
Figure 5B:
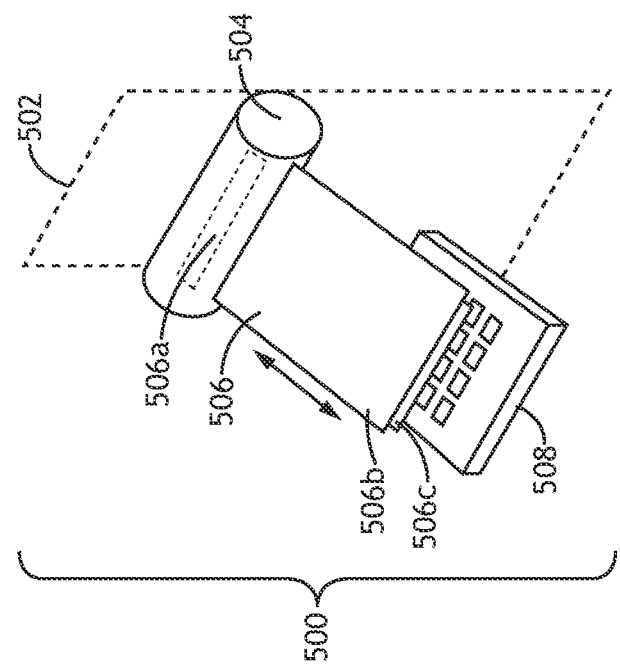

In a further aspect, the inventive concepts disclosed herein are directed to embodiments of a HMI apparatus having a thin and flexible emissive display. Referring now to FIGS. 5A and 5B, illustrations depicting an embodiment of an HMI apparatus (e.g., HMI apparatus 500) integrated with an instrument panel (e.g., panel 502) are shown. The HMI apparatus 500 includes a flexible emissive display 506 and a display support 504. The display support 504 is attached, connected, or otherwise integrated with the instrument panel 502 in order to moveably support the flexible emissive display 506 between the stowed position and the deployed position. In this regard, the emissive display 506 is configured to be rollably stowed/deployed (e.g., as with emissive display apparatus 300).

For example, the display support 504 may moveably support the first end 506a (e.g., distal end) of the emissive display 506 to rollably move the second end 506b (e.g., proximal end) of the emissive display 506 between a stowed position and a deployed position on the instrument panel 502. The emissive display 506 may be positioned such that the second end 506b of the emissive display 506 may be moved above the keypad 508 (e.g., creating at least a bi-layer user interface) using a pull tab 506c attached to the second end 506b of the emissive display 506. In a further aspect, the emissive display 506 is further configured to be retractably stowable.

In further aspects, the keypad 508, is configured to be deployed from an inner stowing compartment integrated with the instrument panel 502 (e.g., as with emissive display apparatus 200). In further aspects, the keypad 508 is configured to be attached to the instrument panel 502 such that the emissive display 506 moves above the keypad 508 for data entry.

In a further aspect, the inventive concepts disclosed herein are directed to embodiments of a HMI apparatus including a display support that is configured to moveably support only the keypad between a stowed and a deployed position. For example, referring to FIG. 4, the emissive display 406 may be mounted to the instrument panel and the keypad 408 may be the only component of HMI apparatus 400 adapted to move. In this regard, the keypad 408 may include one or more hinges and a sliding support (e.g., as in FIG. 2C) to rotate and slide the keypad 408 above the emissive display 406 when entering display data from the keypad 408.

In a further aspect, the inventive concepts disclosed herein are directed to embodiments of a HMI apparatus (e.g., apparatuses 400 or 500) with a keypad configured to be activated upon being moved to a position relative to the emissive display. For example, referring now to FIG. 4, the keypad 408 may be configured to move above the display surface of the emissive display 406 (e.g., via a display support like display support 204 in FIG. 2C) to activate the keypad 408. In this regard, the keypad may be activated to enter display data to be displayed on the display surface while in the deployed position. The display data entered from the keypad may include secondary flight data, which includes, but is not limited to, routing data, airport map data, maintenance data, automatic direction finder (ADF) data, inertial navigation data, radar navigation data, VHF omnidirectional range (VOR) data, or global navigational satellite system (GNSS) data.

In a further aspect, the keypad is configured to be deactivated upon being moved to a position relative to the emissive display. For example, keypad 408 may be configured to move farther away from emissive display 406 in order to be stowed in a stowing compartment. In this regard, keypad 408 may be configured to deactivate upon moving farther away from the emissive display 406.

In a further aspect, the inventive concepts disclosed herein are directed to an embodiment of a HMI apparatus with an emissive display that is deactivated by one or more degrees upon being moved to a partially stowed position. For example, referring to FIGS. 5A and 5B, emissive display 506 may be fully activated upon moving the emissive display to a deployed position (e.g., FIG. 5A), and partially deactivated upon partially stowing the emissive display 506 such that a portion 514 (e.g., half, one-third, or one-fourth) of the emissive display 506 is still deployed (e.g., FIG. 5B). In this regard, the deactivated portion of the emissive display 506 may correspond to the stowed portion of the emissive display. In contrast, the portion 514 of the emissive display 506 that is not stowed, may correspond to the portion of the emissive display that remains active. In a further aspect, the portion 514 of the emissive display 506 that remains active corresponds with a display interface for interfacing with the HMI apparatus 500, or a component (e.g., keypad) of the HMI apparatus 500. In a further aspect, the partial deactivation is achieved by activation means (e.g., a position switch) configured to activate at a first position and partially deactivate and/or partially activate at a second position.

In a further aspect, the inventive concepts disclosed herein are directed to embodiments of a HMI apparatus with a keypad adapted to have a display aperture. Referring to FIG. 4, an embodiment of the HMI apparatus (e.g., HMI apparatus 400) with a display aperture (e.g., display aperture 412) is depicted. For example, the display aperture 412 may be a cut-out area on the keypad 408 that is smaller in size than the display surface of the emissive display 406 (e.g., smaller in size than the total surface area of the emissive display 406). In this regard, the emissive display 406 may be programmed to utilize only a subset of the display surface correlating to the cut-out area 412 when the keypad 408 is moved above the emissive display 406 and activated. In further aspects, the emissive display 406 may also be programmed to utilize the entire display surface when the keypad 408 is deactivated (e.g., moved to a stowed position).

The inventive concepts of the various aspects disclosed herein sometimes illustrate different components contained within, or connected with, different other components. It is to be understood that such depicted architectures are merely illustrative, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Furthermore, it is to be understood that the inventive concepts and their various aspects are defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to aspects of the disclosure containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

It is believed that the inventive concepts disclosed herein and many of their attendant advantages will be understood by the foregoing description, and it will be apparent that various changes may be made in the form, construction and arrangement of the components without departing from the disclosed subject matter or without sacrificing all of its material advantages. The form described is merely for illustrative purposes, and it is the intention of the following claims to encompass and include such changes.

What is claimed:

1. A moveable emissive display apparatus comprising:
    an emissive display having a first end and a second end, the emissive display presenting secondary flight data thereon;
    a keypad configured for data entry, and
    a display support coupled to an avionics instrument panel, the display support configured to moveably support the emissive display and the keypad, the display support configured to moveably support the first end of the emissive display and a first end of the keypad while moving the second end of the emissive display and a second end of the keypad between two or more positions relative to the avionics instrument panel, at least one of the two or more positions comprising a stowed position and at least another of the positions comprising a deployed position, the stowed position being at least partially within a stowing compartment selectively hiding at least a portion of the secondary flight data from being viewed, the stowing compartment being configured to integrate with the avionics instrument panel, wherein the emissive display is configured to be above one or more components of the avionics instrument panel in the deployed position and the keypad is configured to be above at least a portion of the emissive display in the deployed position.

2. The display apparatus of claim 1,
    wherein the display support moveably supports the first end of the emissive display to foldingly move the second end of the emissive display between the stowed position and a deployed position, the deployed position being relative to a primary flight display (PFD); and
    wherein foldingly move is defined as the second end of the emissive display is rotated azimuthally relative to the display support.

3. The display apparatus of claim 2,
    wherein the display support has a longitudinal axis and a vertical axis;

wherein foldingly move is further defined as the second end of the emissive display is rotated azimuthally from one degree (1°) to one-hundred and sixty degrees (160°) relative to the longitudinal axis of the display support; and wherein the stowed position and the deployed position are defined by a separation of at least ninety degrees (90°) between the stowed position and the deployed position such that the second end of the emissive display is closer in proximity to the vertical axis of the display support in the deployed position than when in the stowed position.

4. The display apparatus of claim 1, further comprising a keypad, wherein the keypad is configured to be deployed from the stowing compartment.

5. The display apparatus of claim 4,
wherein the emissive display is flexible;
wherein the display support moveably supports the first end of the emissive display to rollably move the second end of the emissive display between the stowed position and a deployed position; and
wherein the second end of the emissive display is moved towards the first end such that the emissive display is rolled about the first end of the emissive display.

6. The display apparatus of claim 5, wherein the display support moveably supports the first end of the emissive display to retractably move the second end of the emissive display between the stowed position and the deployed position.

7. A deployable emissive display apparatus comprising:
an emissive display having a first end and a second end, the emissive display presenting secondary flight data thereon; and
a keypad configured for data entry;
a display support coupled to an avionics instrument panel, the display support configured to moveably support the emissive display and the keypad, the display support configured to moveably support the first end of the emissive display and a first end of the keypad while moving the second end of the emissive display and a second end of the keypad between two or more positions relative to the avionics instrument panel, at least one of the two or more positions comprising a deployed position selectively uncovering or presenting the secondary flight data on the emissive display, the deployed position being at least partially out of a stowing compartment that is configured to integrate with the avionics instrument panel, wherein the emissive display is configured to be above one or more components of the avionics instrument panel in the deployed position and the keypad is configured to be above at least a portion of the emissive display in the deployed position.

8. The display apparatus of claim 7, wherein the emissive display is activated upon being moved to the deployed position and deactivated upon being moved to a stowed position without obstructing a primary flight display (PFD).

9. The display apparatus of claim 7,
wherein the display support has a longitudinal axis and a vertical axis;
wherein the display support moveably supports the first end of the emissive display to foldingly move the emissive display between a stowed position and the deployed position;
wherein foldingly move is further defined as the second end of the emissive display is rotated azimuthally from one degree (1)° to one-hundred and sixty degrees (160°) relative to the longitudinal axis of the display support; and wherein the stowed position and the deployed position are defined by a separation of at least ninety degrees (90°) between the stowed position and the deployed position such that the second end of the emissive display is closer in proximity to the vertical axis of the display support in the deployed position than when in the stowed position.

10. The display apparatus of claim 7, further comprising a keypad, wherein the keypad is configured to be deployed from the stowing compartment.

11. The display apparatus of claim 10,
wherein the emissive display is flexible;
wherein the display support moveably supports the first end of the emissive display to rollably move the second end of the emissive display between the stowed position and the deployed position; and
wherein the second end of the emissive display is moved towards the first end such that the emissive display is rolled about the first end of the emissive display.

12. The display apparatus of claim 11, wherein the display support moveably supports the first end of the emissive display to retractably move the second end of the emissive display between the stowed position and the deployed position.

13. A human machine interface (HMI) apparatus comprising:
an emissive display configured to present monitoring, controlling, operational, or navigational data thereon;
a keypad configured for data entry;
a stowing compartment configured to integrate with an instrument panel; and
a display support coupled to the instrument panel, the display support configured to moveably support a first portion of the HMI apparatus while a second portion moves between two or more positions relative to the instrument panel without obstructing critical data on the instrument panel, at least one of the two or more positions comprising a stowed position that the emissive display is at least partially within the stowing compartment, and at least another of the positions comprising a deployed position;
wherein the first portion of the HMI apparatus comprising a first end of the emissive display and a first end of the keypad, the second portion comprising a second end of the emissive display and a second end of the keypad,
wherein the instrument panel is an avionics instrument panel or a marine vessel instrument panel and the second end of the emissive display selectively moves to uncovering or presenting the secondary flight data on the emissive display, wherein the emissive display is configured to be above one or more components of the avionics instrument panel in the deployed position and the keypad is configured to be above at least a portion of the emissive display in the deployed position.

14. The HMI apparatus of claim 13, wherein the first portion comprises the first end of the emissive display and the second portion comprises the second end of the emissive display, and upon being moved to the stowed position the second end of the emissive display is a first distance from the display support, and upon being moved to a deployed position the second end is a second distance from the display support, the second distance being greater than the first distance.

15. The HMI apparatus of claim 13,
wherein the display support moveably supports at least the keypad relative to the instrument panel, and the keypad is configured to be activated upon being moved above the emissive display and to be deactivated upon moving the keypad to the stowed position;

wherein the keypad has a display aperture, the display aperture being defined by an area that is smaller in size than a display surface of the emissive display, the keypad configured to selectively cover a portion of the display surface without obstructing the critical data; and wherein the emissive display is configured to selectively display the critical data on a subset of the display surface when the keypad is activated, the subset of the display surface being defined by the aperture area of the keypad.

16. The HMI apparatus of claim 15, further comprising:

one or more processors and one or more sets of instructions implemented by the one or more processors, the one or more processors communicatively coupled to one or more components of the instrument panel;

wherein the instrument panel is the avionic instrument panel;

wherein the monitoring, controlling, operational, or navigational data comprises secondary flight data; wherein the secondary flight data comprises at least one of routing data, airport map data, maintenance data, automatic direction finder (ADF) data, inertial navigation data, radar navigation data, VHF omnidirectional range (VOR) data, or global navigational satellite system (GNSS) data; wherein the critical data comprises information presented on a primary flight display (PFD); wherein the one or more components of the instrument panel includes at least a flight management computer (FMC); and wherein implementing the one or more sets of instructions causes the keypad and the emissive display to interface with the FMC such that the keypad, the emissive display, and the one or more processors together comprise an aircraft control display unit (CDU).

17. The HMI apparatus of claim 13, wherein the first portion comprises the first end of the emissive display and the first end of the keypad and the second portion comprises the second end of the emissive display and the second end of the keypad; and wherein, the movement of the keypad between the stowed position and a deployed position is at least one of sequential to or simultaneous with the movement of the emissive display between the stowed position and the deployed position.

18. The HMI apparatus of claim 13, wherein the display support moveably supports at least the emissive display relative to the instrument panel;

wherein the emissive display is flexible; and wherein the display support moveably supports the first end of the emissive display to rollably move the second end of the emissive display between the stowed position and a deployed position, the second end moving towards the first end such that the emissive display is rolled about the first end to move the emissive display into the stowed position.

19. The HMI apparatus of claim 13, wherein the first portion comprises the first end of the emissive display and the second portion comprises the second end of the emissive display;

wherein the display support moveably supports the first end of the emissive display to retractably move the second end of the emissive display between the stowed position and a deployed position on the instrument panel; and wherein the keypad is below the emissive display such that upon moving the emissive display to the deployed position the emissive display is above a portion of the keypad.

* * * * *